Oct. 4, 1960 A. L. HERRMANN 2,954,940

LIMIT SWITCH FOR TAPE RECORDERS

Filed Feb. 12, 1959 2 Sheets-Sheet 1

Adolf L. Herrmann,
INVENTOR.
S. J. Rotondi,
BY A. T. Dupont,
H. M. Snyder, and
Alvin E. Moore,
ATTORNEYS.

LIMIT SWITCH FOR TAPE RECORDERS

Filed Feb. 12, 1959 2 Sheets-Sheet 2

Adolf L. Herrmann,
INVENTOR.
BY S. J. Rotondi,
A. T. Dupont,
H. M. Snyder, and
Alvin E. Moore,
ATTORNEYS.

1

2,954,940

LIMIT SWITCH FOR TAPE RECORDERS

Adolf L. Herrmann, Huntsville, Ala., assignor to the United States of America as represented by the Secretary of the Army Filed Feb. 12, 1959, Ser. No. 792,927

11 Claims. (Cl. 242—55.12)

(Granted under Title 35, U.S. Code (1952), sec. 266)

The invention described herein may be manufactured and used by or for the Government for governmental purposes without the payment of any royalty thereon.

This invention relates to a winding and reeling device. It is of particular value in switch assemblies of tape recorders or similar devices. Such switch assemblies provide means for automatically stopping a tape at a designated point with respect to a recording head that functions in the reproduction of sound or signals.

In the use of such switches, for example in the tape recorders or similar devices that are inclosed in inaccessible cases and require automatic control, there is a need for automatically stopping the tape-driving motor at exactly the right time, so that the tape does not become disengaged from the reel. Also, there is a need for stopping the tape at an exact point, to enable the device to be used for timing purposes, as in the programming of missiles or the recording and transmission of scientific information on satellites. There is a further need for limit switches, for controlling the tape's drive motor, which are actuated by a tape as the tape winds on and off a reel.

In view of these facts, an object of this invention is to provide a winding and reeling mechanism that includes an electric switch assembly, which will automatically stop a tape at a specific point.

Another object of this invention is to provide means for automatically controlling a tape of a recorder or similar device that is enclosed in an inaccessible case.

A further object of this invention is to provide an assembly which will automatically position a tape at the same starting point after the tape has been unwound and then rewound.

The foregoing and other objects of this invention will become more fully apparent from the following detailed description of the embodiment of the invention and from the accompanying drawings, in which.

Figures 2, 3, 4:
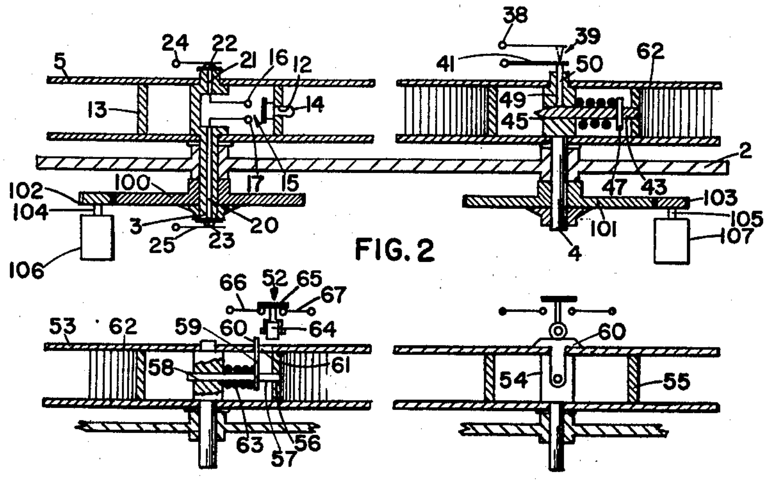
Figure 2 is an elevational sectional view, taken along line 2—2, of Figure 1.
Figure 3 is an elevational, sectional view of another embodiment, using a cam arrangement to operate the switch.
Figure 4 is an elevational, sectional view showing the embodiment of Figure 3 as rotated thru 90° in a clockwise direction.

In the drawings, wherein for the purpose of illustration there are shown preferred embodiments of the invention, the numeral 1 designates a conventional tape recorder or like device. This recorder has a mounting plate 2, which is adapted to receive shafts 3 and 4, as shown in Figure 2. One end of each of the shafts 3 and 4 is adapted to receive a reel designated by numerals 5 and 6, respectively. The other end of each of shafts 3 and 4 is attached to gears 100 and 101, respectively. Gears 100 and 101 are abutted respectively by gears 102 and 103. Gears 102 and 103 are connected to shafts 104 and 105 of motors 106 and 107, respectively.

Tape-tensioning motors 106 and 107 are small electric motors of the type commonly used in recording devices for the tensioning of tape between the reels. They receive their power directly from power supply 108, which may be a source of direct current, but preferably is a commonly used source of alternating current. After the switch or plug of power supply 108 is actuated, current is continuously supplied to motors 106 and 107. Each of these motors is of lower power than the main, reversible tape-driving motor 31. In operation, one tape-tensioning motor will receive power for driving a reel, while the other motor will act as a tape-tensioning generator or braking means. Thus these auxiliary, tape-tensioning motors have equal and opposite torques, one motor positively rotating in one direction while the other motor (acting as a generator) is being rotated against its torque by main drive motor 31, supplying a braking force. When motor 31 is stopped, and current is still supplied to motors 106 and 107, the equal and opposite torques of these tape-tensioning motors cause them to remain stationary, in a tape-tensioning position. On the other hand, when motor 31 is rotating the smaller motors provide means for varying the angular speed of the reels in order to maintain the same linear speed at the two reel ends of the tape.

When the driving direction is reversed, the functions of the motors are reversed.

Each of the reels 5 and 6 is adapted to receive a tape 7, which is secured to the reels by fastening pins 8. The tape is guided from one reel over idler wheels 9, across recorder head 10, over device 11 which is a combined tape-drive sprocket and cam, and on to the other reel.

Reel 5 contains an opening 12 in the core 13 which is adapted to receive spring tensioned, push-button contact 14, which actuates a micro-switch 15 that is located inside the core 13. The micro-switch is placed so that when tape 7 pushes the push button contact 14 toward the inside of the core 13, the switch 15 will connect the contacts 16 and 17. The contacts 16 and 17 thus are connected by conductors 18 and 19 which extend thru openings 20 and 21, in the center of shaft 3, to insulated slip contacts 22 and 23, or other suitable contacts, such as ring contacts, located at the ends of shaft 3.

The slip contact 22 is connected thru conductor 24 to contact 26 of cam operated switch 27. The conductor 24 is connected to a reversible tape-drive motor 31, which drives device 11 by means of friction wheel or other gear means 31A which connects with a face of the sprocket and cam device 11. The tape-drive motor has one end of conductor 32 connected to it. The other end of conductor 32 is connected to one side of the power supply 108.

Slip contact 23 is connected thru conductor 25 to a junction point 28 between two conductors. One of these conductors, 29, has one end connected to the junction point and the other end connected to contact 30 of switch 27. The other conductor, 33, extends from junction point 28 to one side of reversing switch 34. The opposite side of switch 34 is connected to the other side of the power supply by means of conductor 35. This side of the power supply is also connected by conductor 37, to one side of switch 36, operated, for starting the recorder or other tape assembly, in a forward direction.

The other side of switch 36 is connected to a contact arm 38 of switch 39 by a conductor 40. Another contact arm, 41, of switch 39 is connected to reversible motor 31 by conductor 42. This contact arm 41 is made of resilient material, to act as a spring, in forcing pin 50 against actuator 43. This resiliency is of special value when the tape assembly is subject to weightless conditions in space. One end of actuator 43 is located inside core 44 of reel 6 and freely fitting in an opening 45 in shaft 4. The other end of the actuator extends thru hole 46 in the core 44.

The end of actuator 43 that extends thru hole 46 has a stop 47 fixed to it at a predetermined distance from shaft 4.

The stop 47 is used as an abutment for one end of spring tensioning means 48. The other ends of means 48 abuts the shaft 4, so that the spring is compressed between elements 4 and stop 47, when the tape is wound on reel 6. When the actuator is released by unwinding of the tape, stop 47 abuts the core, and the end of actuator 43 then extends thru hole 46. This position permits spring arm 41 to push pin 50 downward.

Shaft 4 has a second hole 49 along the shaft's axis, which is perpendicular to and joins opening 45. The hole 49 is of a size which freely receives the slidable pin 50.

One end of pin 50 is integrally connected to the resilient movable contact arm 41. The other end of pin 50 is slidable along the bearing surface of the tapered end of actuator 43.

When the actuator 43 is in the position shown in Figure 2, while the tape is wound on reel 6, contacts 38 and 41 will be closed. When the reel 6 is emptied switch 39 will be opened due to the fact that spring tensioning means 48 moves the actuator toward the core. This movement will cause pin 50 to move downward along the tapered end of actuator 43 due to the spring action of resilient contact arm 41, allowing contacts 38 and 41 to open.

Figure 1:
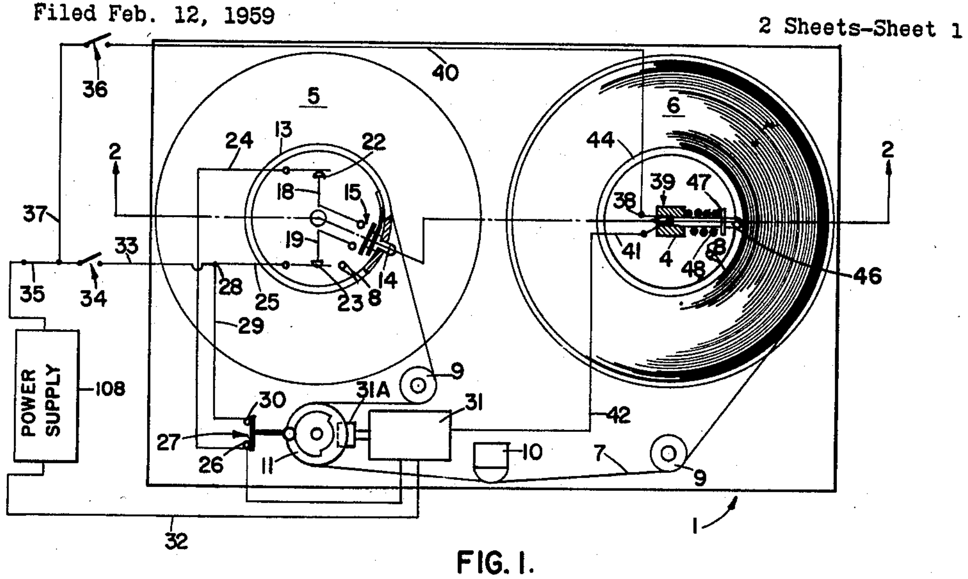
Figure 1 is a plan view, partly in section, of the switch assembly, showing two modifications of a suitable switch, one type being shown in one of a pair of reels, the other type being shown in the second reel of the pair.

The operation of the embodiments of the limit switches in Figure 1 is as follows:

Reel 6 is loaded with tape, which is passed over the idler wheels, recorder head, combined tape-drive sprocket and cam device 11, and attached to reel 5 by fastening pin 8. The recorder is checked to insure that switch 27 is closed as shown in Figure 1.

The recorder is now ready for operation and can be controlled in a forward or reverse direction by means of switches 34 and 36 which are located outside the main casing of the tape assembly.

To operate the recorder in a forward direction, switch 36 is closed and power from the supply passes thru the switch, thru conductor 40, and to contact 38 of switch 39.

As shown in Figures 1 and 2, switch 39 is closed by the tape, so that the power passes thru the switch to movable contact 41, thru conductor 42, and to reversible motor 31.

When power from the power supply reaches the motor, the circuit to the motor is complete, since the other side of the power supply circuit is connected by conductor 32 directly to the motor.

Reel 5 will be rotated by the operation of motor 106 and the tape will be advanced from reel 6 to reel 5 by the combined drive sprocket and cam device 11, until the last layer of tape is removed enough to release the pressure applied by the tape from actuator 43. This action allows the spring tension means 48 to force the stop against the core. This causes pin 50 to move downward, due to the spring action of the resilient contact arm 41 and the tapered end of actuator 43. This movement of pin 50 opens switch 39, causing motor 31 to stop, thereby stopping the recording tape at a predetermined place. In the example shown, the winding is stopped when the tape is nearly unwound from reel 6.

To operate the assembly in a reverse direction, combined drive sprocket and cam device 11 is set so that switch 27 is closed; switch 36 is opened and switch 34 is closed, whereby power from the power supply passes thru conductors 33 and 29, switch 27 and to motor 31. During this reverse operation, while reel 5 is loaded with tape, power also can pass thru conductors 25 and 19, switch 15 (closed by the tape), conductor 18, conductor 24 and contact 26 to motor 31. Thus power reaches motor 31, to drive it in reverse direction, whether or not switch 27 is closed by device 11.

When the last layer of tape begins to leave the core 13 of reel 5, the spring-tensioned push button 14 moves in a direction away from shaft 3. This movement of button 14 will open switch 15. The recorder will still operate, since the power still has a closed circuit thru switch 27, until combined drive sprocket and cam device 11 rotates to the portion of the cam which will open switch 27.

When switch 27 thus is opened its circuit will be opened and motor 31 will stop, causing the tape to stop at a predetermined location. The use of switch 27 thus allows the device to operate for a predetermined time, depending on the size and position of the cam, after switch 15 is opened. With this arrangement, the tape can be advanced and rewound for varying periods of time, and thereafter still be accurately positioned for a new start of the entire program, from a predetermined point near the beginning of the tape.

The embodiment shown in Figures 3 and 4 comprises another type of limit switch. This embodiment can be used with the same wiring arrangement as the embodiment in Figures 1 and 2, since the difference is in the means for opening and closing the tape-controlled switch 52.

In Figures 3 and 4, a reel 53 is secured to a shaft 54 in any known manner, as by means of a key and slot. A core 55 having a hole 56 is fitted between the sides of the reel 53. A push rod 57 has one end slidably fitted in hole 56 and the other end slidably fitted in a hole 58 in shaft 54. A rod 59 has one end connected between the ends of push rod 57. The other end of rod 59, which forms cam surface 60, extends thru a slot 61 in the side 62 of reel 53.

A spring or similar resilient means 63 is placed between shaft 54 and rod 59. This spring will bias push rod 57 away from shaft 54, until the rod 59 serves as a stop by abutting the core 55.

A roller 64 is secured above the side 62 of reel 53 by spring biased, movable contact 65 of switch 52. Switch contacts 66 and 67 are connected to the circuit in the same manner as the embodiment shown in Figures 1 and 2. The roller 64 is secured in a position which ensures that switch 52 will remain closed when the reel is full and will be opened by the roller 64 when the reel is empty.

The operation of this embodiment is essentially the same as the operation of the embodiment shown in Figures 1 and 2, with the exception of the means for actuating the switch which will be described below.

As shown in Figures 3 and 4, the switch 52 remains closed as long as the reel contains enough tape to keep the push rod 57 pressed inward.

When the tape releases the push rod 57, spring 63 moves the push rod 57 radially until the rod 59, which is connected to rod 57, reaches a position in slot 61 where it abuts core 55.

When rod 59 abuts core 55, cam surface 60 will have moved to a position on a circle that intersects roller 64; and from this position the cam surface, usually after further rotation, contacts the roller. The roller then will roll upon the cam surface, causing switch 52 to be opened and stopping motor 31.

A very important advantage of the embodiment of Figures 3 and 4 is that the switch arrangement is suitable for low-speed assemblies. However, an increase in the length of the cam surface enables efficient use of this embodiment at high-speeds.

Figure 5:
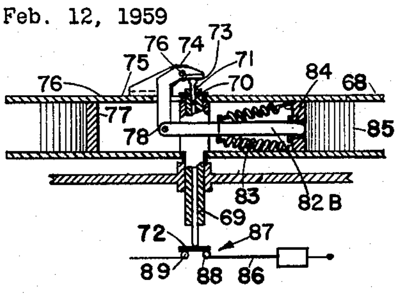
Figure 5 is an elevational, sectional view of another embodiment of the invention.
Figure 6:
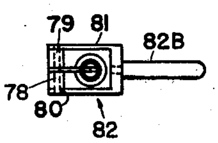
Figure 6 is a plan view of the switch-closing actuator of the embodiment of Figure 5.
Figure 7:
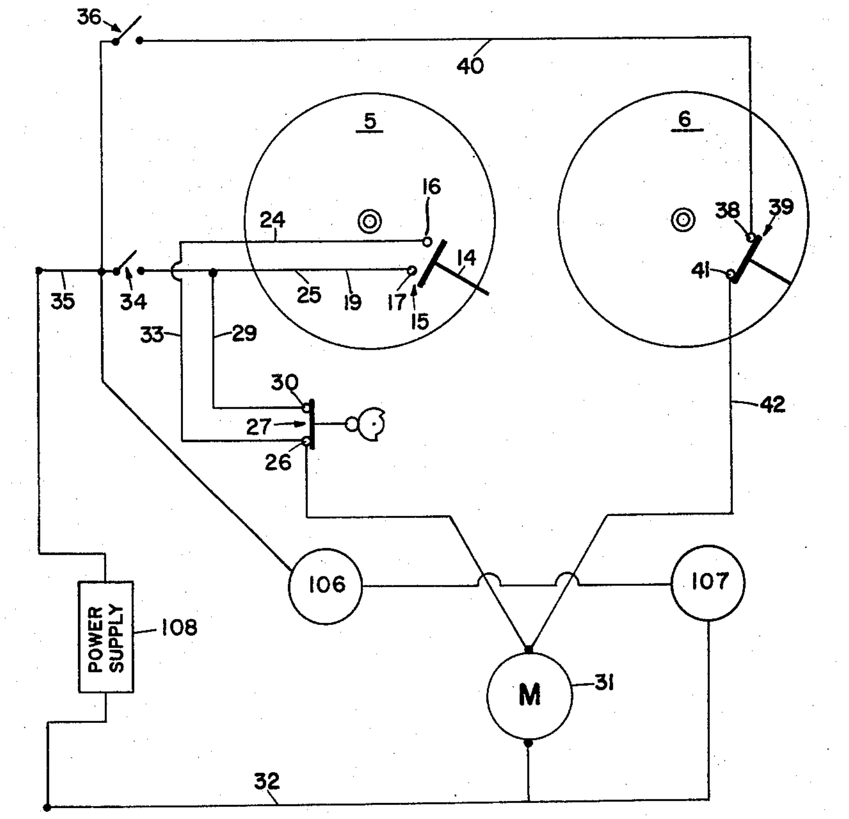
Figure 7 shows a simplified wiring diagram for the switches.

In Figures 5 and 6, another type of limit switch is shown as being used in a winding and reeling device.

In this embodiment reel 68 is mounted on a shaft 69.

The shaft 69 contains a longitudinal hole 70. A rod, 71, of a length longer than shaft 69, is slidably positioned in hole 70. One end of the rod 71 is located inside the recorder mechanism and has a contact member 72 attached to it. The other end of the rod is shaped into an enlarged rounded head 73, and is located outside the reel 68.

The round head 73 serves as a mechanical contact for an L-shape member 74. A portion of member 74 extends thru side 75 of reel 68 to a position inside core 77. Member 74 has a pivot 76 on side 75 of reel 68.

The portion of member 74 that is inside core 77 has a hole 78, adapted to receive a pin 79.

The pin 79 is long enough to pass thru and be secured in holes 80. Holes 80 are in arms 81 of Y-shaped actuator 82, located inside core 77. Arms 81 are spaced apart, so as to fit around shaft 69.

The base 82B of Y-shaped actuator 82 has a pair of ends of a double spring-tensioning means 83 attached to it, near the shaft 69. The end of this base is then slidably secured in hole 84 of core 77, by the attachment of the other pair of ends of the tensioning means to the core 77.

When the reel is loaded with tape 85, as shown in Figure 5, resilient means 83 is tensioned, and resilient contact arm 86 of switch 87 is forced down, so that contact 72 touches contacts 88 and 89, closing switch 87.

The embodiment shown in Figures 5 and 6 operates on the same principle as the embodiments of Figures 1 to 4. The operation of this embodiment is a follows: As pointed out above, the switch 87 is closed when the reel is full of tape and will remain closed as long as a layer of the tape remains on the reel. When the tape unwinds, the switch remains closed until the last round begins to unwind. As the last round of tape begins to leave the reel, the tape's pressure on base 82B of the actuator is released, and the tensioning means exerts pressure on the base and forces the base outward, thru hole 84.

This movement of the actuator causes L-shaped member 74 to pivot, since arms 81 of the actuator are attached to the lower portion of the L-shaped member by pin 79.

The pivoting of the L-shaped member releases the pressure exerted by the member on round head 73 of rod 71. As this pressure is released resilient contact arm 86 forces the rod 71 upward. This movement of the rod contact member 72 to move upward, breaking the connection between contacts 88 and 89, and opening switch 87.

When switch 87 thus is opened, power to motor 31 is cut off, and the tape will stop at a predetermined point.

The forms of the invention herein shown and described are preferred embodiments. However, various changes in the shape, size and arrangement of parts may be resorted to without departing from the spirit of the invention, or the scope of the subjoined claims.

The following invention is claimed:

1. A winding and reeling device for automatic operation in a sealed container comprising: A mounting plate; a pair of shafts rotatably supported by said plate; a reel attached to each shaft; a tape having its ends fixed to said reels; rollers for guiding said tape; reversible motor means for driving said tape, comprising a rotary cam device; recording means in contact with said tape; means for maintaining tension of the tape between said reels and motor means; a source of electric current; a first switch electrically connected with said source of current; a second, automatic switch, electrically connected to said first switch, said automatic switch comprising a part operated by said tape for closing the second switch and means for opening the second switch when the tape pressure is released; a conductor connecting said automatic switch to said motor means, for forward operation of the motor means; a second conductor connecting said motor means with said source of electric current; a third switch electrically connected with said source of current; a fourth, automatic switch electrically connected to said third switch, said fourth switch comprising a part operated by said tape for closing said fourth switch and means for opening said fourth switch when the tape pressure is released; a conductor connecting said fourth switch in a circuit with said motor means, for reverse operation of the motor means; a fifth switch comprising a part operated by said rotary cam device; electrically conducting means connecting said fourth and fifth switches and said motor means, whereby a second circuit is effected thru said fourth and fifth switches and said second conductor to said source of current, and whereby said motor in its reverse operation turns said rotary cam device, making and breaking a circuit thru said fifth switch, and whereby when said fourth switch is opened by said switch-opening means after release of tape pressure and the cam portion of said rotary cam device has turned a predetermined extent after said release, both of said circuits are opened.

2. A winding and reeling device comprising: a support; a pair of reels journaled relative to said support; a flexible band fixed to said reels; reversible motor means for driving said band, comprising a rotary cam device; means for maintaining tension of the band between said reels and motor means; a source of electric current; a first switch, electrically conducting means connecting said source of current, said first switch and said motor means, for forward operation of said motor means, whereby said band is unwound from one of said reels to the other reel; a second switch comprising a part operated by said band for closing said second switch and means for opening said second switch when the band pressure is released; electrically conducting means connecting in a circuit said source of current, said second switch and said motor means, for the primary supply of current for reverse operation of said motor means; a third switch comprising a part operated by said cam device for opening and closing said third switch; electrically conducting means connecting in a second circuit said source of current; said third switch and said motor means for a secondary supply of current through said second circuit for reverse operation of said motor means, whereby said motor in its reverse operation turns said rotary cam device, making and breaking said second circuit, and whereby when said second switch is opened by said switch-opening means after release of band pressure and the cam portion of said rotary cam device has turned a predetermined extent after said release, both of said circuits are opened.

3. A device as set forth in claim 2, in which said first switch is opened or closed by movement of a spring biased actuator, tapered at one end.

4. A device as set forth in claim 2, in which said first switch comprises a contact integrally connected to a resilient arm.

5. A device as set forth in claim 2, in which said means for opening said second switch comprises a leaf spring.

6. A device as set forth in claim 2, in which said second switch is connected to a pair of slip contacts.

7. A device as set forth in claim 2, in which said means for opening said second switch when the band pressure is released, comprises a cam surface, a contact movable in a vertical plane, a roller rotatably secured to one end of said movable contact, a push rod integrally connected to said cam surface and push rod biasing means.

8. A device as set forth in claim 7, in which said cam surface rotates relative to said roller.

9. A device as set forth in claim 2, in which said part operated by said band for closing said second switch is a substantially Y-shaped actuator.

10. A device as set forth in claim 9, in which said

Y-shaped actuator has a pair of coil springs secured to its leg.

11. A device as set forth in claim 2, in which said means for opening said second switch when the band pressure is released comprises a pair of coil springs and a resilient contact arm.

References Cited in the file of this patent

UNITED STATES PATENTS

| | | |
|---|---|---|
| 1,124,879 | Edmond et al. | Jan. 12, 1915 |
| 2,227,303 | Flaws | Dec. 31, 1940 |